US008059614B2

(12) United States Patent  
Rajasimman et al.

(10) Patent No.: US 8,059,614 B2
(45) Date of Patent: Nov. 15, 2011

(54) PSEUDORANDOM NOISE SELECTION METHOD FOR MOBILE COMMUNICATION SITES

(75) Inventors: Vijayasimman Rajasimman, Richardson, TX (US); Nivedan Thadasina, Allen, TX (US); John C. Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1110 days.

(21) Appl. No.: 11/848,706

(22) Filed: Aug. 31, 2007

(65) Prior Publication Data

US 2009/0059869 A1   Mar. 5, 2009

(51) Int. Cl.
*H04B 7/216* (2006.01)
(52) U.S. Cl. ...................................... 370/335
(58) Field of Classification Search .................. 370/209, 370/335, 338, 401, 331, 332, 208, 342, 350, 370/320, 35, 336; 455/452, 509, 12.1, 406, 455/433, 436, 444, 456, 435, 3, 455; 375/146, 375/150, 149, 148, 130, 142, 147; 342/357
See application file for complete search history.

(56) References Cited

U.S. PATENT DOCUMENTS

| 5,179,719 | A | * | 1/1993 | Hidaka | ......................... | 455/3.03 |
| 5,577,168 | A | | 11/1996 | Haas et al. | | |
| 5,734,639 | A | * | 3/1998 | Bustamante et al. | .......... | 370/208 |
| 5,812,543 | A | * | 9/1998 | Sugita | ............................ | 370/335 |
| 5,982,324 | A | * | 11/1999 | Watters et al. | ............ | 342/357.29 |
| 6,091,955 | A | | 7/2000 | Aalto et al. | | |
| 6,205,132 | B1 | | 3/2001 | Hong et al. | | |
| 6,321,090 | B1 | | 11/2001 | Soliman | | |
| 6,405,028 | B1 | * | 6/2002 | DePaola et al. | ............... | 455/406 |
| 6,424,834 | B1 | | 7/2002 | Chang et al. | | |
| 6,430,168 | B1 | | 8/2002 | Djurkovic et al. | | |
| 6,621,811 | B1 | | 9/2003 | Chang et al. | | |
| 6,643,319 | B1 | * | 11/2003 | Suzuki et al. | ................. | 375/145 |
| 6,671,506 | B1 | * | 12/2003 | Lee | ............................... | 455/406 |
| 6,826,402 | B1 | | 11/2004 | Tran | | |
| 6,928,283 | B2 | | 8/2005 | Rudolf | | |
| 7,019,691 | B1 | * | 3/2006 | Soltanian et al. | ............ | 342/368 |
| 7,554,965 | B2 | * | 6/2009 | Karaoguz | ...................... | 370/342 |
| 2002/0067762 | A1 | * | 6/2002 | Neufeld et al. | ............... | 375/149 |
| 2002/0086675 | A1 | | 7/2002 | Mansour | | |
| 2003/0008669 | A1 | * | 1/2003 | Stein et al. | ..................... | 455/456 |
| 2003/0128747 | A1 | * | 7/2003 | Poon et al. | ..................... | 375/148 |
| 2004/0233874 | A1 | * | 11/2004 | Baker | .......................... | 370/335 |
| 2006/0140152 | A1 | * | 6/2006 | Wang et al. | .................. | 370/331 |
| 2006/0245407 | A1 | * | 11/2006 | Chen et al. | .................... | 370/338 |
| 2007/0178900 | A1 | * | 8/2007 | Frank et al. | ................ | 455/435.1 |
| 2007/0213066 | A1 | * | 9/2007 | Claussen et al. | ............. | 455/444 |
| 2008/0159236 | A1 | * | 7/2008 | Ch'ng et al. | ................. | 370/335 |
| 2009/0052395 | A1 | * | 2/2009 | Bao et al. | ...................... | 370/331 |
| 2009/0059869 | A1 | * | 3/2009 | Rajasimman et al. | ........ | 370/335 |
| 2009/0186626 | A1 | * | 7/2009 | Raghothaman | ............ | 455/452.2 |

OTHER PUBLICATIONS

Weal, Paul et al.; "Optimisation of CDMA-Based Mobile Telephone Networks: Algorithmic Studies on Real-World Networks"; University of Exeter, UK; 2006, 10 pgs.

* cited by examiner

*Primary Examiner* — Hassan Phillips
*Assistant Examiner* — Prenell Jones

(57) ABSTRACT

A method for allocating a pseudorandom noise identifier (PN) to a home base station (HBS) is provided. The method includes determining the location of the HBS, determining the PNs in use adjacent to the HBS, and using the location of the HBS and the PNs in use to select a PN for the HBS.

20 Claims, 5 Drawing Sheets

Fig. 4
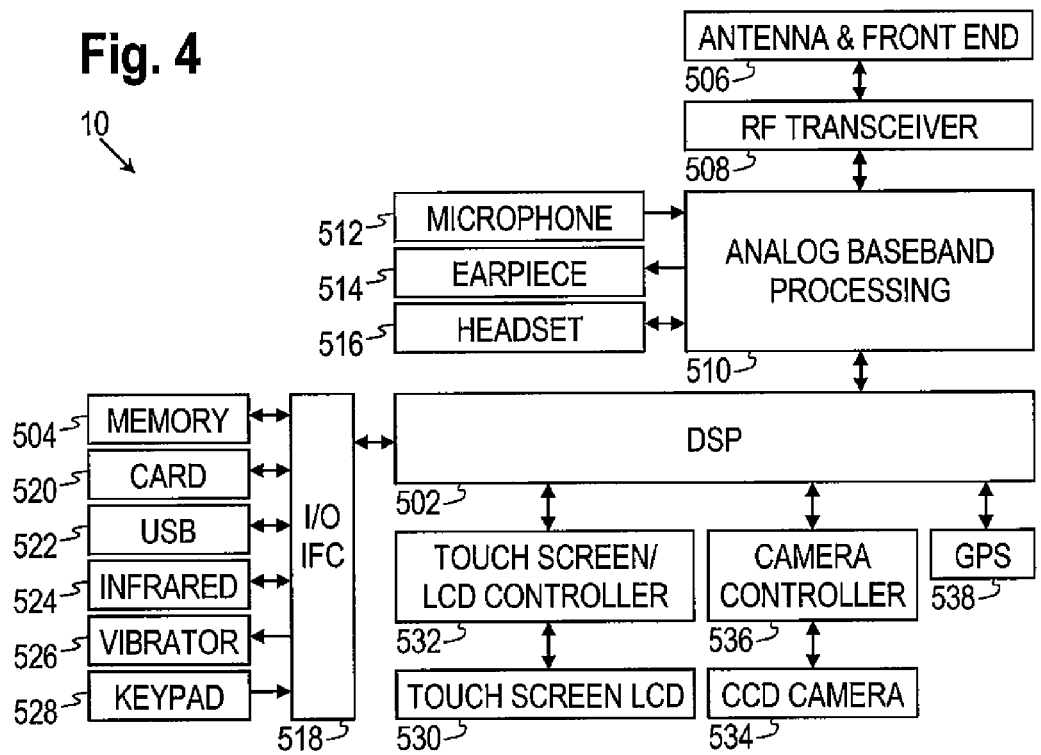
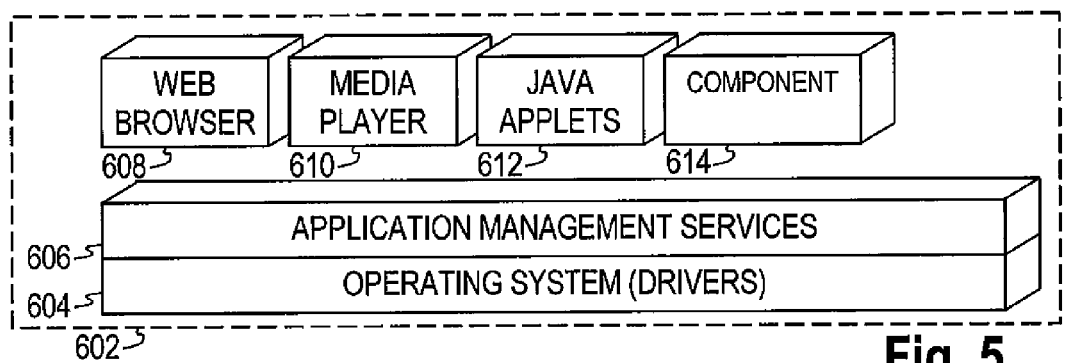
Fig. 5

PSEUDORANDOM NOISE SELECTION METHOD FOR MOBILE COMMUNICATION SITES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Natural and man-made obstacles can create areas of inadequate coverage in a wireless telecommunications network. For example, a user device may experience a dropped call or an inability to initiate a call when the user device is inside a building or is otherwise blocked from successfully sending or receiving radio frequency (RF) signals. As used herein, the term "user device" refers to devices that might be used by users in a telecommunications network. This typically includes mobile terminals such as mobile telephones, personal digital assistants, handheld computers, and similar devices, but can also include fixed terminals such as residential gateways.

SUMMARY

In one embodiment, a method for allocating a pseudorandom noise identifier (PN) to a home base station (HBS) is provided. The method includes determining the location of the HBS, determining the PNs in use adjacent to the HBS, and using the location of the HBS and the PNs in use to select a PN for the HBS.

In another embodiment, a system for selection of a PN for home base stations is provided. The system includes an HBS and a telecommunications network. The HBS includes a global positioning system (GPS) accessible to the HBS and operable to determine the location of the HBS. The telecommunications network is operable to communicate with the HBS and maintains a list of PNs designated for use in a region. The HBS informs the telecommunications network of its location as determined by the GPS. The telecommunications network sends the HBS the list of PNs designated for use in the region near the location. A PN that is not already in use in the region is selected from the list.

In another embodiment, an HBS is provided. The HBS includes a GPS that can determine the location of the HBS. The HBS can communicate with a telecommunications network. The telecommunications network maintains a list of PNs designated for use in a region. The HBS determines the PNs already in use in the region. A PN is selected based on the HBS locations, the list of PNs for the region, and the PNs in use.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a block diagram of a user device operable for some of the various embodiments of the disclosure.

FIG. 5 is a diagram of a software environment that may be implemented on a user device operable for some of the various embodiments of the disclosure.

DETAILED DESCRIPTION

Figure 1:
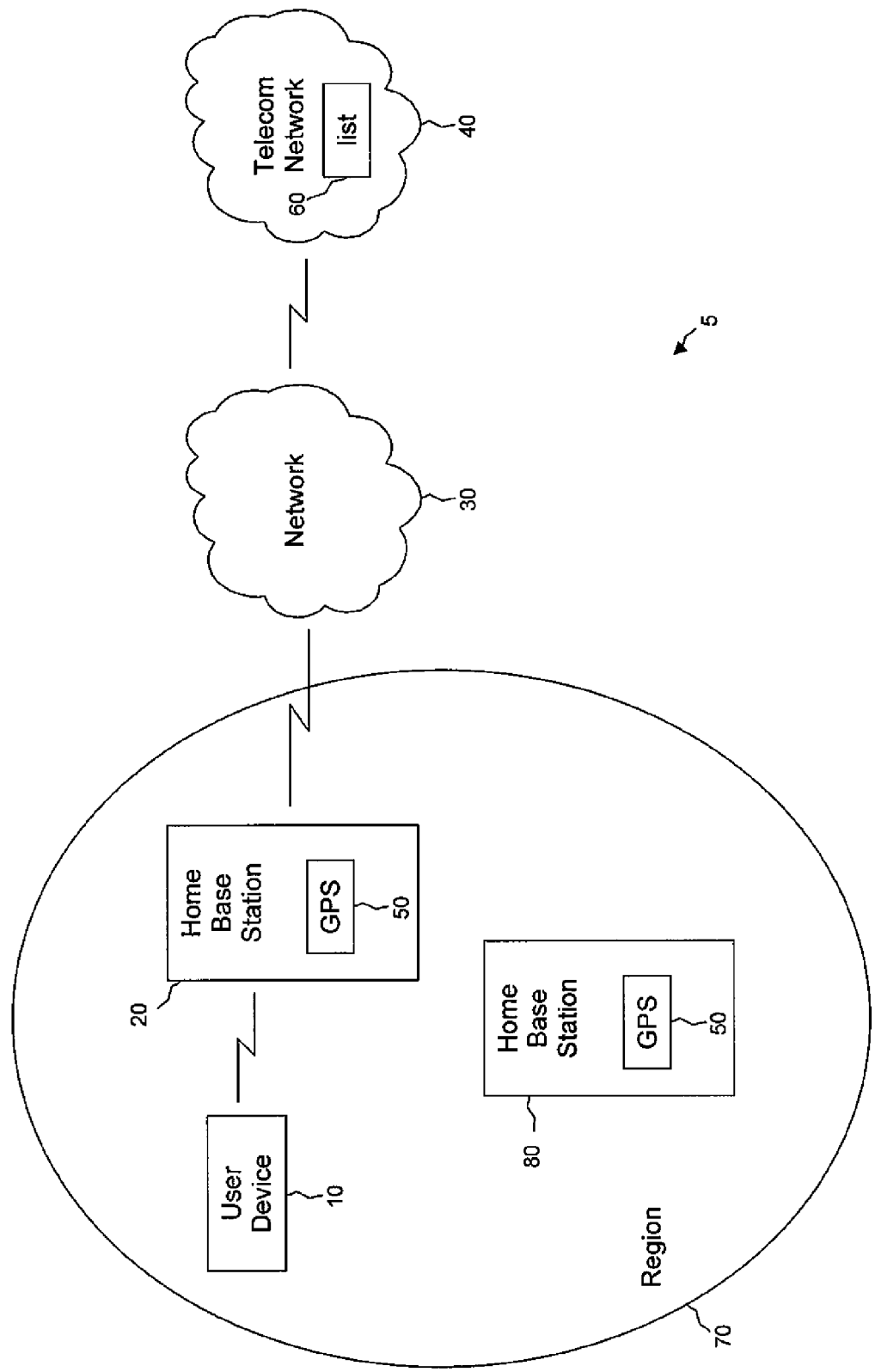
FIG. 1 is a diagram of a telecommunications system according to an embodiment of the disclosure.

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Various types of private base station have been proposed to deal with areas of inadequate coverage in a telecommunications network. These units can perform functions similar to those performed by a publicly accessible base station but at a reduced power. The term "home base station" (HBS) will be used herein to refer to such base stations, but it should be understood that the units could be used in business offices, government buildings, schools, and other locations besides homes.

While a traditional wireless telecommunications base station might provide coverage over a wide geographic region for a large number of users, an HBS might provide coverage only in an area the size of a typical home and for only a limited number of users. When an HBS is placed inside a home, for example, a user device in the home can send RF signals to and receive RF signals from the HBS rather than making potentially unsuccessful attempts at sending RF signals to and receiving RF signals from a traditional, publicly accessible base station. The HBS can then communicate with subsequent components in a telecommunications network. Connecting to the telecommunications network via the HBS can shrink or eliminate areas of inadequate coverage that might exist in the home when connections are attempted via a traditional base station.

An HBS is typically intended for use by only a small number of user devices. An identifier for each user device authorized to use a particular HBS might be associated with an identifier for that HBS. Only the user devices that have been registered with the HBS in this manner might be able to gain access to the HBS. For example, an HBS in a home might be configured to be used only by user devices belonging to family members who live in that home. A different user device that entered or came near the home might not be able to gain access to the HBS. Similarly, the family members from that home might not be able to use an HBS in a different home.

As is well known in the art, a code division multiple access (CDMA) base station might broadcast a beacon signal that provides information about the base station. User devices can use the beacon signal to determine which base station to connect to and to determine whether a call should be handed off from one base station to another. For a traditional, publicly accessible base station, the beacon signal typically operates at approximately the same power as the signal that carries the actual voice and data traffic. For an HBS, the beacon signal typically operates at a greatly reduced power so that the beacon signal can be detected only by user devices that are physically close to the HBS, such as user devices that are in the same home as the HBS.

A traditional, publicly accessible base station might transmit voice and data traffic to subsequent components in the telecommunications network via RF signals. For some HBSs, voice and data traffic might be transmitted to the subsequent components via the Internet. That is, an HBS might contain appropriate hardware and software that allows the HBS to connect to the Internet via standard wired or wireless connections. Data transmitted from a user device to the HBS via an RF signal might be transmitted from the HBS to the subsequent components in the telecommunications network via the Internet connection. In this way, an owner of an HBS might be able to conduct wireless communications in a location where a traditional base station is inaccessible or where access to a traditional base station is unreliable.

A pseudorandom noise (PN) sequence is typically used to provide a unique identifier for a cell site. That is, a PN can be viewed as a code by which a base station can be identified. A base station typically includes its PN in the beacon signal that it broadcasts and user devices that receive the beacon signal can use the PN to identify the base station. For traditional, publicly accessible base stations, PNs are typically assigned manually by a telecommunications operator or other entity that has control over the base stations. The manual PN assignment process can ensure that each base station in a geographic region has a unique PN and that the identity of a base station is unambiguously provided to user devices that receive the base station's beacon signal.

Unlike traditional, publicly accessible base stations, HBSs are likely to be owned and controlled by consumers. It is typically undesirable to require a consumer to perform manual tasks, such as the manual assignment of a PN to an HBS. Therefore, automatic selection of a PN by an HBS may be desirable. It may also be desirable that the automatic selection be done intelligently to prevent ambiguity in the PN assignments for a set of HBSs in the same geographic region. In a given region, the number of PNs that are dedicated for use by HBSs might be relatively low. If care is not taken in the assignment of these PNs, the same PN could be assigned to two or more HBSs that are near each other. If two nearby HBSs have the same PN, a user device may not be able to determine which one it should communicate with and may not be able to lock on to either one. An automated PN selection procedure that decreases the likelihood that two nearby HBSs will have the same PN can prevent ambiguity in the attempted communications between user devices and HBSs.

In an embodiment, a set of PNs might be dedicated to HBSs in a geographic region. A list of the PNs assigned to the region can be maintained by the telecommunications network operator that provides the telecommunications services accessible through the HBSs. When an HBS is powered up, the HBS can use a global positioning system (GPS) or a similar positioning device to discover its location. The HBS can then inform the telecommunications network of its location. The network can then inform the HBS of the PNs that have been dedicated to HBSs in the region near that location. The HBS can then scan its neighbor HBSs to determine which of those PNs are already in use by the other HBSs. The HBS can then inform the network of the results of its scan. That is, the HBS can subtract the PNs already in use from the list of PNs assigned to the region and can send the network a list of assigned PNs that are not already in use. The network can then select one of the PNs not in use and can direct the HBS to use the selected PN. Not only can the assignment of PNs in this manner prevent two nearby HBSs from having the same PN, this automated PN selection process can increase the efficiency of the reuse of PNs.

FIG. 1 illustrates an embodiment of a system 5 for automatic, intelligent selection of a PN for an HBS. A user device 10 can communicate wirelessly with an HBS 20 that is intended to be used only by that user device 10 or by a small set of user devices 10. The HBS 20 can connect to a network 30, such as the Internet, through a wired or wireless connection. Via the network 30, the HBS 20 can connect to a telecommunications network 40, which might be a code division multiple access (CDMA) network or some other well known type of telecommunications network. In this way, when the user device 10 is near the HBS 20, the user device 10 can engage in wireless telecommunications when there is no traditional base station nearby or when access to a traditional base station is unreliable.

In an embodiment, the HBS 20 includes or is capable of accessing a GPS 50 or a similar positioning device. When the HBS 20 is powered on, the GPS 50 can determine where the HBS 20 is located. The HBS 20 can then send this location information to the network 40. Actions that are described herein as happening to the network 40 or as being taken by the network 40 should be understood as possibly happening to or being taken by one or more components within the network 40, such as servers or other computing devices.

The network 40 maintains a list 60 of the PNs that have been dedicated for use by HBSs in a region 70 that includes the HBS 20. Upon receiving the location information from the HBS 20, the network 40 sends the contents of this list 60 to the HBS 20. The HBS 20 is capable of scanning the region 70 to determine the PNs that are already in use by one or more other HBSs 80 in the region 70.

Upon receiving the list 60 from the network 40, the HBS 20 performs such a scan to determine which of the PNs on the list 60 are already in use. By consulting the list 60, the HBS 20 can narrow the search it performs for the PNs that are in use. The HBS 20 then sends the results of the scan to the network 40. Based on the results of the scan, the network 40, or perhaps the HBS 20 in some embodiments, selects a PN for the HBS 20 that was not found to be in use by any other HBSs 80 in the region 70. The network 40 then directs the HBS 20 to use the selected PN. In this way, the likelihood that the HBSs 20 and 80 in the region 70 will use different PNs is increased and the user device 10 can more reliably communicate with the HBS 20 with which it is associated.

In an embodiment, prior to the network 40 selecting the PN, the network 40 might perform a cross check to determine if there are any other HBSs 80 in the region 70 that the HBS 20 might have missed in its scan. The results of this cross check might then be used to eliminate additional PNs from consideration as the PN to be used for the HBS 20. For example, as each other HBS 80 registers with the network 40, the network 40 might update a record of the other HBSs 80 in the region 70. The network 40 might compare this record of the other HBSs 80 with the other HBSs 80 found by the HBS 20 in its scan.

As mentioned previously, the number of PNs available for use in the region 70 might be relatively low. In some cases, the number of HBSs 20 and 80 in the region 70 might exceed the number of available PNs for the region 70. In such cases, one or more of the PNs might be placed on a different frequency and an automated, intelligent PN allocation procedure similar to that described above might be carried out to assign the PNs on the different frequency. The functionality to determine when a different frequency is needed and to designate the different frequency might reside in the HBS 20 or in the telecommunications network 40.

Figure 2:
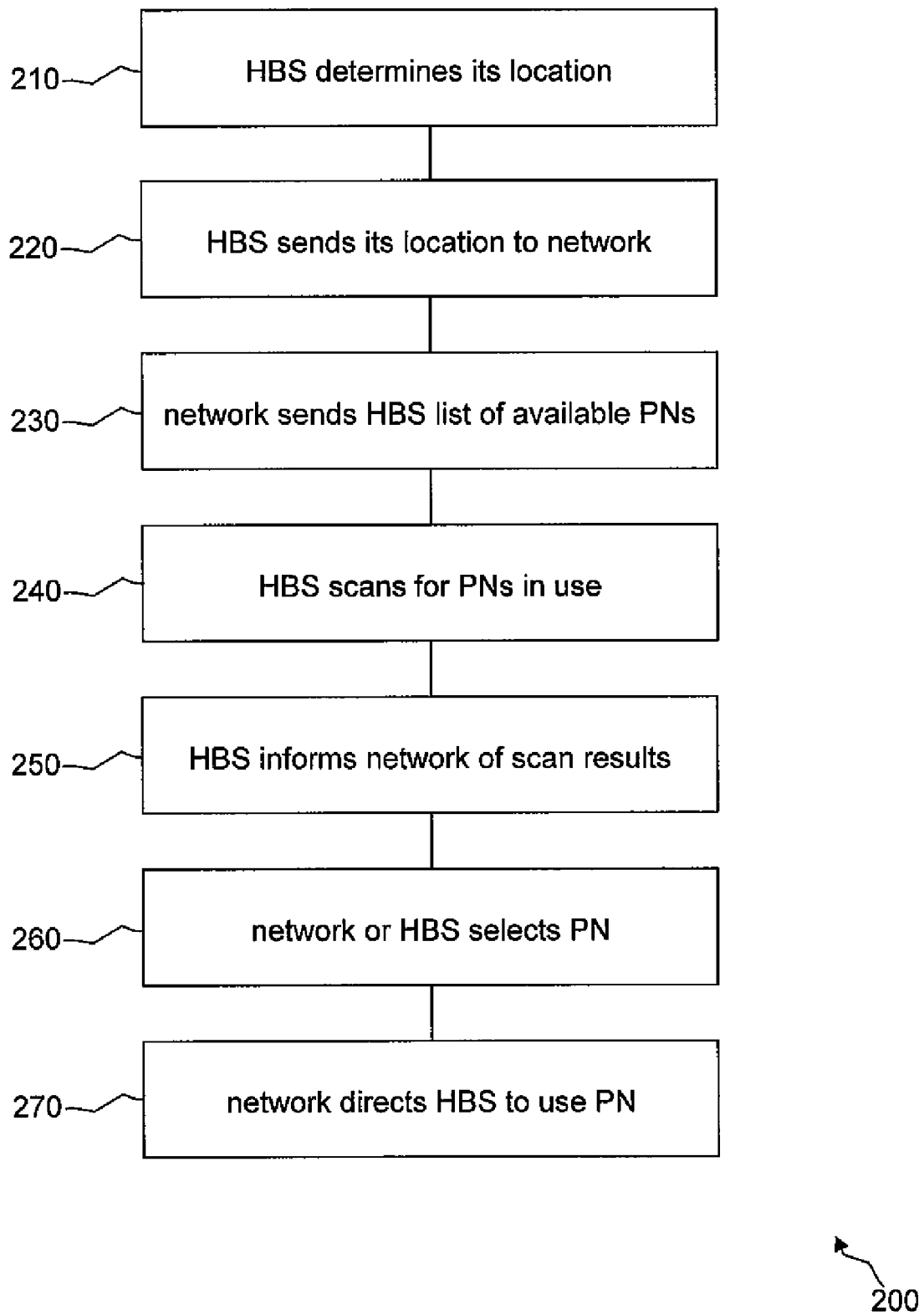
FIG. 2 is a diagram of a method for allocating a pseudorandom noise sequence to a home base station according to an embodiment of the disclosure.

FIG. 2 illustrates an embodiment of a method 200 for allocating a PN to an HBS. In block 210, the HBS determines its location, perhaps through the use of a GPS. In block 220, the HBS informs a telecommunications network of its location. In block 230, the network provides the HBS with a list of PNs that are available for use in the region where the HBS is located. In block 240, the HBS scans the other HBSs in the region to determine which of the available PNs for the region are already in use. In block 250, the HBS informs the network of the results of the scan. For example, the HBS might remove the PNs that are already in use from the list of available PNs and return the list to the network. In block 260, the network selects a PN for the HBS based on the results of the scan. In block 270, the network directs the HBS to use the selected PN. In other embodiments, the HBS might select a PN for the HBS on its own, in which case the HBS would not inform the network of the results of the scan, the network would not select a PN for the HBS, and the network would not direct the HBS to use the selected PN. Any of these embodiments can prevent two nearby HBSs from using the same PN and can provide the ability to reuse PNs efficiently.

Figure 3:
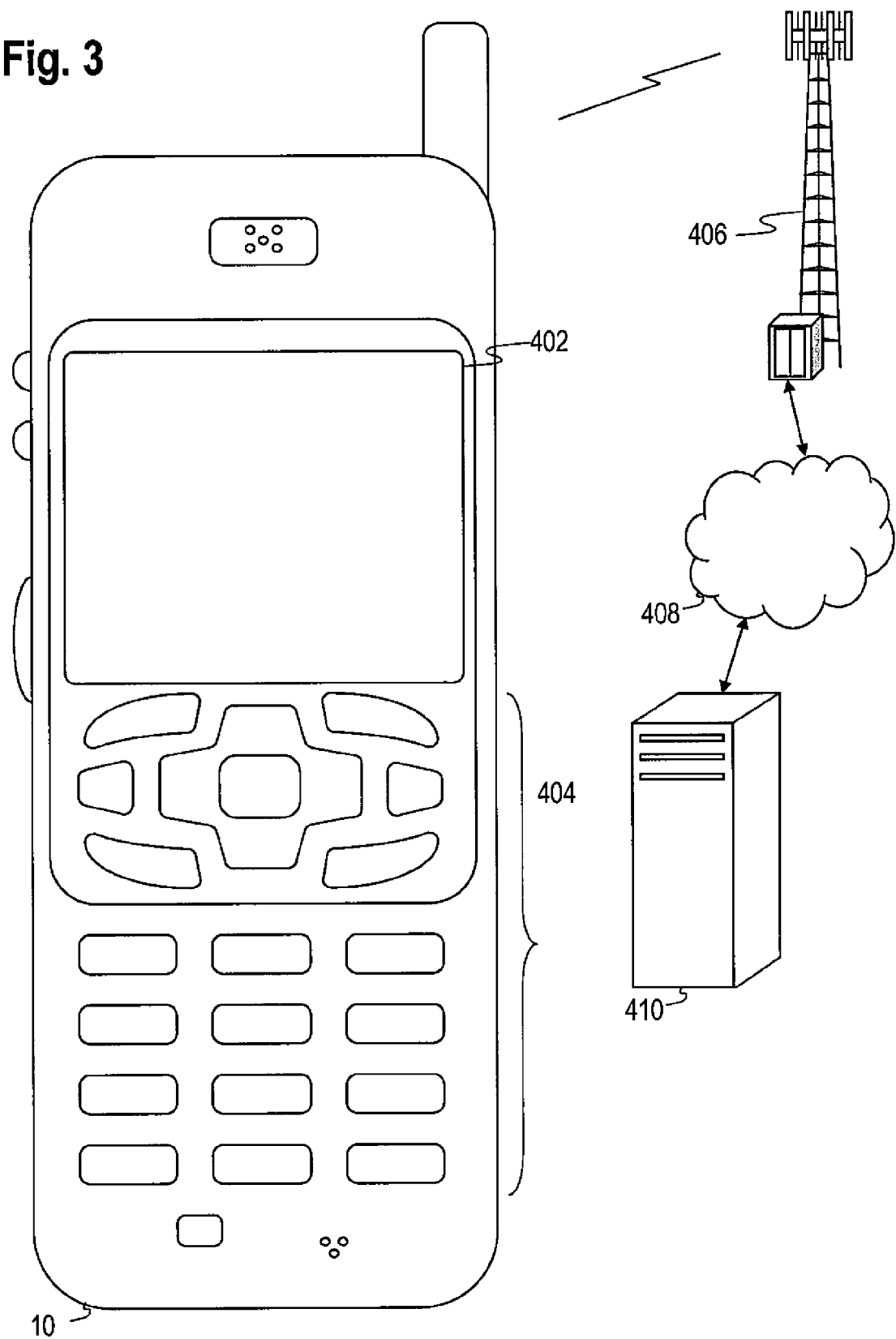
FIG. 3 is a diagram of a wireless communications system including a user device operable for some of the various embodiments of the disclosure.

FIG. 3 shows a wireless communications system including an embodiment of the user device 10. The user device 10 may be operable for implementing aspects of the present disclosure, but the present disclosure should not be limited to these implementations. Though illustrated as a mobile phone, the user device 10 may take various forms including a wireless handset, a pager, a personal digital assistant (PDA), a portable computer, a tablet computer, or a laptop computer. Many suitable handsets combine some or all of these functions. In some embodiments of the present disclosure, the user device 10 is not a general purpose computing device like a portable, laptop or tablet computer, but rather is a special-purpose communications device such as a mobile phone, wireless handset, pager, or PDA. The user device 10 may support specialized activities such as gaming, inventory control, job control, and/or task management functions, and so on.

The user device 10 includes a display 402 and a touch-sensitive surface or keys 404 for input by a user. The user device 10 may present options for the user to select, controls for the user to actuate, and/or cursors or other indicators for the user to direct. The user device 10 may further accept data entry from the user, including numbers to dial or various parameter values for configuring the operation of the handset. The user device 10 may further execute one or more software or firmware applications in response to user commands. These applications may configure the user device 10 to perform various customized functions in response to user interaction. Additionally, the user device 10 may be programmed and/or configured over-the-air, for example from a wireless base station, a wireless access point, or a peer user device 10.

The user device 10 may execute a web browser application which enables the display 402 to show a web page. The web page may be obtained via wireless communications with a cell tower 406, a wireless network access node, a peer user device 10 or any other wireless communication network or system, such as the telecommunications network 40 of FIG. 1. The cell tower 406 (or wireless network access node) is coupled to a wired network 408, such as the Internet. Via the wireless link and the wired network, the user device 10 has access to information on various servers, such as a server 410. The server 410 may provide content that may be shown on the display 402. Alternately, the user device 10 may access the cell tower 406 through a peer user device 10 acting as an intermediary, in a relay type or hop type of connection.

FIG. 4 shows a block diagram of the user device 10. While a variety of known components of user devices 10 are depicted, in an embodiment a subset of the listed components and/or additional components not listed may be included in the user device 10. The user device 10 includes a digital signal processor (DSP) 502 and a memory 504. As shown, the user device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the user device 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the user device 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the user device 10 to send and receive information from a cellular network or some other available wireless communications network or from a peer user device 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the user device 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the user device 10 to function as a peripheral device to exchange information with a personal computer or other computer system. The infrared port 524 and other optional ports such as a Bluetooth interface or an IEEE 802.11 compliant wireless interface may enable the user device 10 to communicate wirelessly with other nearby handsets and/or wireless base stations.

The input/output interface 518 may further connect the DSP 502 to the vibrator 526 that, when triggered, causes the user device 10 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the user device 10. Another input mechanism may be the touch screen LCD 530, which may also display text and/or graphics to the user. The touch screen LCD controller 532 couples the DSP 502 to the touch screen LCD 530.

The CCD camera 534 enables the user device 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the user device 10 to determine its position. Various other peripherals may also be included to provide additional functions, e.g., radio and television reception.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the user device 10. Also shown in FIG. 5 are a web browser application 608, a media player application 610, and Java applets 612. The web browser application 608 configures the user device 10 to operate as a web browser, allowing a user to enter information into forms and select links to retrieve and view web pages. The media player application 610 configures the user device 10 to retrieve and play audio or audiovisual media. The Java applets 612 configure the user device 10 to provide games, utilities, and other functionality. A component 614 might provide functionality related to the HBS 20.

Figure 6:
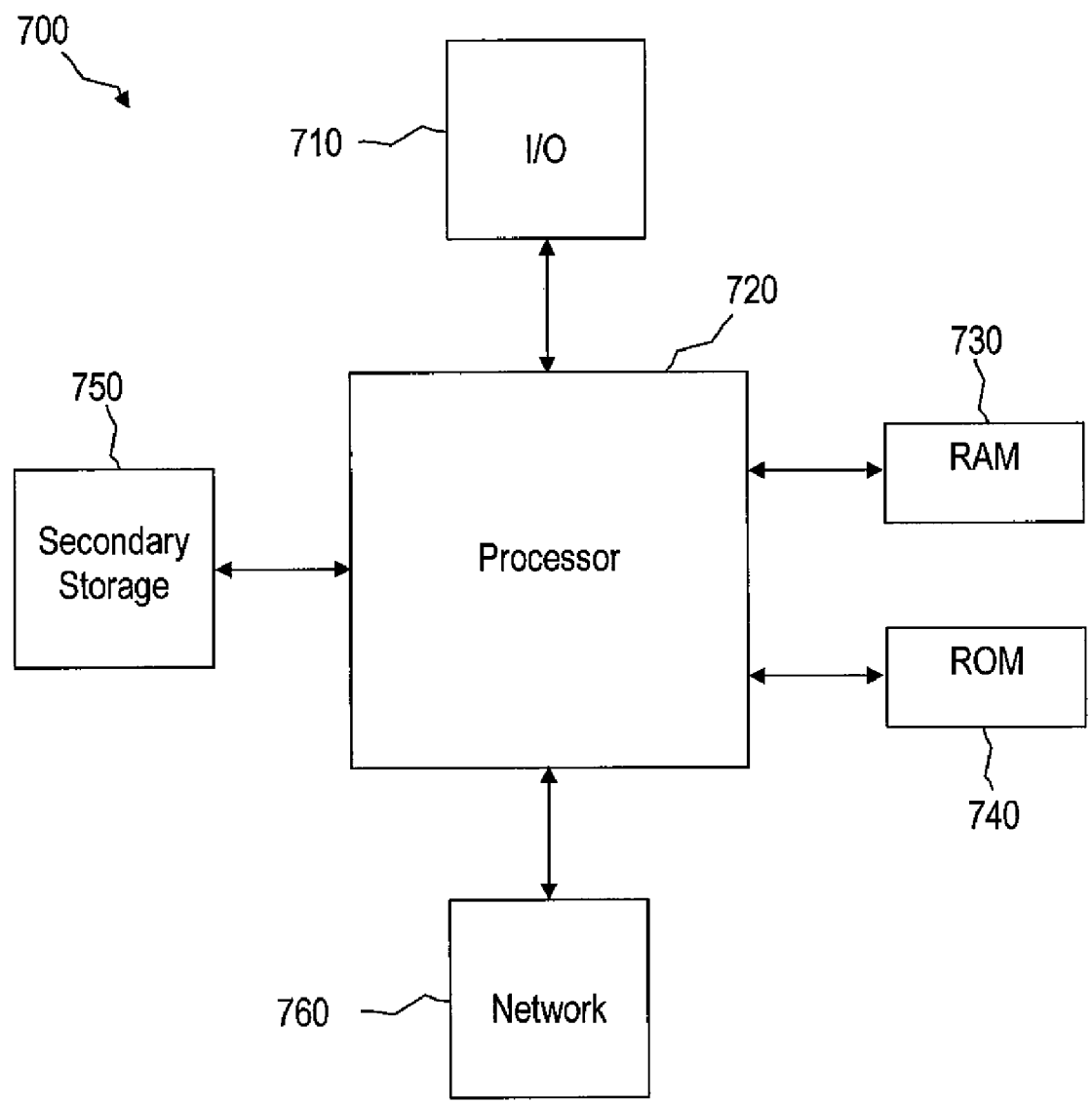
FIG. 6 is an illustrative general purpose computer system suitable for some of the various embodiments of the disclosure.

The HBS 20 may include any general-purpose or special-purpose computer with sufficient processing power, memory resources, and network throughput capability to handle the necessary workload placed upon it. FIG. 6 illustrates a typical, general-purpose computer system 700 that may be suitable for implementing one or more embodiments disclosed herein. Similar components and functions might also be applicable to a suitable special-purpose computer. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of allocating a pseudorandom noise identifier (PN) for a home base station (HBS), the method comprising:
    determining a location of the HBS;
    determining a list of PNs designated for a region corresponding to the location of the HBS;
    determining the PNs in use adjacent the HBS;
    placing the PNs on a different frequency when a quantity of HBSs in the region exceeds a quantity of PNs designated for the region; and
    using the location of the HBS and the PNs in use to select a PN for the HBS.

2. The method of claim 1, further comprising:
    informing a telecommunications network of the location of the HBS;
    receiving from the telecommunications network the list of PNs designated for the region;
    determining which of the PNs on the list are already in use;
    selecting one of the PNs that is on the list and is not already in use; and
    using the selected PN.

3. The method of claim 2, wherein the HBS informs the telecommunications network of the PNs that are on the list and that are not already in use, the telecommunications network selects one of the PNs that is on the list and is not already in use, and the telecommunications network directs the HBS to use the selected PN.

4. The method of claim 2, wherein the HBS selects one of the PNs that is on the list and is not already in use and uses the selected PN.

5. The method of claim 3, further comprising, prior to the telecommunications network selecting the one of the PNs that is on the list and is not already in use, the telecommunications network checking for adjacent HBSs in the region.

6. The method of claim 1, further comprising, determining whether the quantity of HBSs in the region exceeds the quantity of PNs designated for the region.

7. The method of claim 1, wherein the telecommunications network is a code division multiple access network.

8. A system for selection of a pseudorandom noise identifier (PN) for home base stations, comprising:
    a telecommunications network configured to communicate with the HBS and maintain a list of PNs designated for use in each region, receive a location of a home base station (HBS), select a PN from the list of PNs for a region corresponding to the location of the HBS that is not already in use in the region, and place the PNs on a different frequency when a quantity of HBSs in the region exceeds a quantity of PNs designated for the region.

9. The system of claim 8, wherein the telecommunications network is further configured to determine which PNs on the list of PNs for the region are not in use in the region.

10. The system of claim 9, wherein the telecommunications network sends to the HBS the list of PNs for the region corresponding to the location of the HBS and receives results of a scan that determines which of the PNs on the list of PNs for the region are in use.

11. The system of claim 10, wherein, prior to the telecommunications network selecting a PN from the list, the telecommunications network performs a cross check for adjacent HBSs in the region that may have been missed in the scan performed by the HBS.

12. The system of claim 8, wherein the telecommunications network determines whether the quantity of HBSs in the region exceeds the quantity of PNs designated for the region.

13. The system of claim 8, wherein the telecommunications network is a code division multiple access network.

14. A home base station (HBS), comprising:
a global positioning system (GPS) configured to determine a location of the HBS; and
a processor configured to communicate the location of the HBS to a telecommunications network, receive a list of pseudorandom noise identifiers (PNs) designated for use in a region based on the location of the HBS, determine PNs already in use in the region, place the PNs on a different frequency when a quantity of HBSs in the region exceeds a quantity of PNs designated for the region, and determine which PN is to be used by the HBS.

15. The HBS of claim 14, wherein the processor performs a scan to determine which PNs on the list of PNs for the region are not in use in the region.

16. The HBS of claim 15, wherein the processor sends scan results to the telecommunications network of the PNs and receives from the telecommunications network a PN from the list that is to be used by the HBS.

17. The HBS of claim 15, wherein the processor selects a PN from the list that is not already in use in the region and uses the selected PN.

18. The HBS of claim 16, wherein, prior to the telecommunications network selecting a PN from the list, the telecommunications network checks for adjacent HBSs in the region.

19. The HBS of claim 14, wherein the processor determines whether the quantity of HBSs in the region exceeds the quantity of PNs designated for the region.

20. The HBS of claim 14, wherein the telecommunications network is a code division multiple access network.

\* \* \* \* \*